Patented June 10, 1952

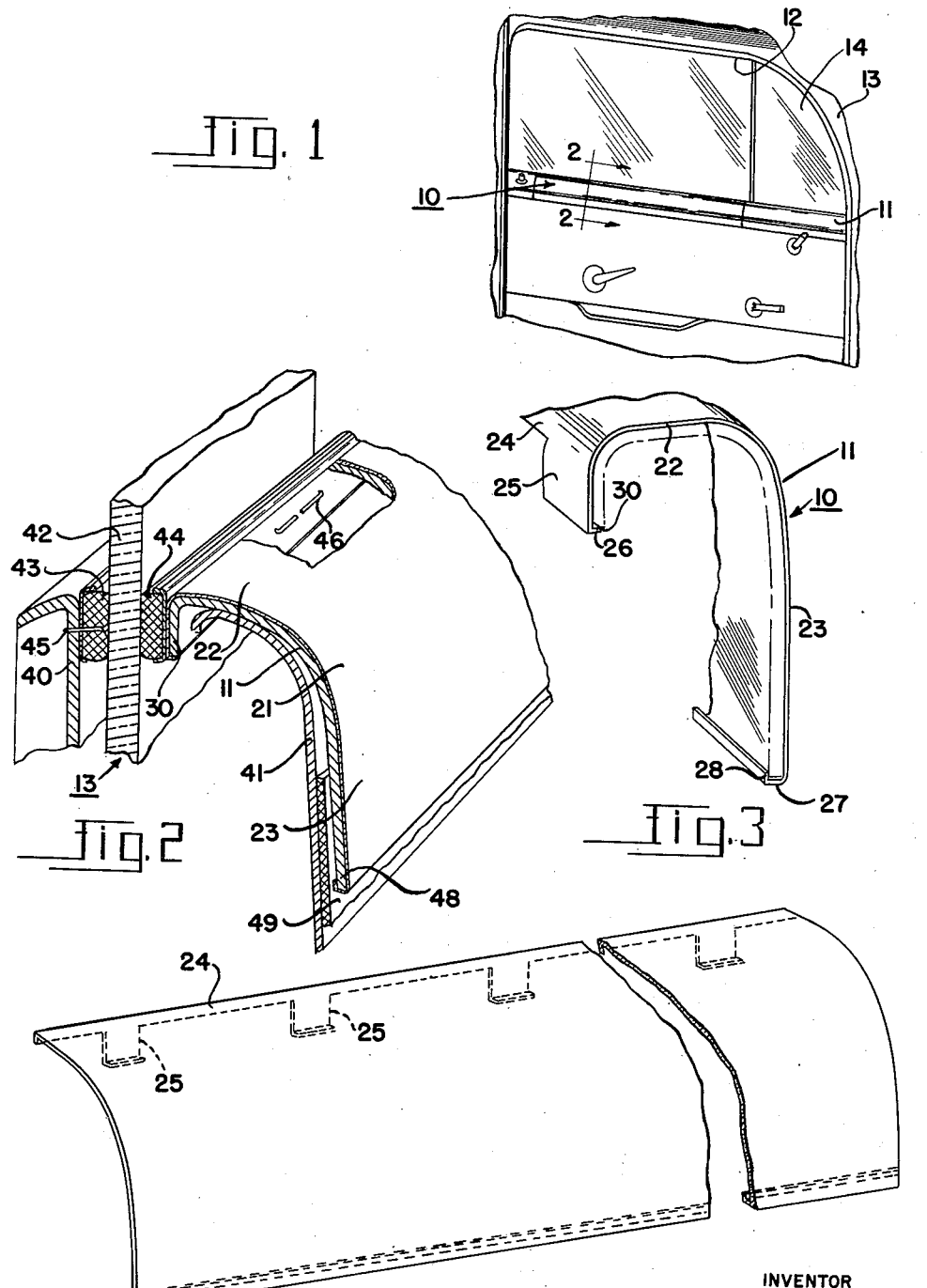

2,600,296

UNITED STATES PATENT OFFICE 2,600,296

MOLDING PROTECTOR

Howard A. Jacobs, Dayton, Ohio

Application May 31, 1950, Serial No. 165,304

2 Claims. (Cl. 296—49.2)

This invention relates to a protective molding for covering the trim strip of an automobile door to eliminate wear on the surface of the trim strip.

It is a well-known practice for motorists to drive in a position with the left arm resting on the bottom trim strip of a door opening. Constant engagement of the arm on the surface of the trim strip, and perspiration from the arm causes rapid deterioration of the decorative finish on the trim strip, resulting in a bad appearance of the trim strip within a very short period of time.

Also, as any motorist knows, the metal trim molding around the opening in an automobile door becomes extremely hot in the summertime so that for relatively long periods of time it is extremely uncomfortable, if not impossible to rest a bare arm on the trim molding of the car door.

It is therefore an object of this invention to provide a molding strip that can be placed upon the metal trim molding strip along the lower edge of a window opening of a car door to protect the surface of the trim molding.

It is still another object of the invention to provide a molding strip that can be placed upon the trim strip along the lower edge of a window opening of a car door without in any way disrupting the structure of the trim strip.

It is still another object of the invention to provide a protective molding strip in accordance with the foregoing objects that is provided with means for locking the protective molding strip onto the trim strip of the car door, and which locking means is integral with the protective molding strip.

It is still another object of the invention to provide a protective molding strip in accordance with the foregoing objects wherein the strip is constructed of a transparent material to make it inconspicuous when in place on the trim strip of a car door.

Further objects and advantages will become apparent from the drawings and the following description.

In the drawings:

Figure 1 is a perspective elevational view of an automobile car door having the protective molding strip of this invention mounted on the bottom strip of the window opening of the car door.

Figure 2 is an enlarged cross-sectional view along line 2—2 of Figure 1.

Figure 3 is an end elevational view of the protective molding strip of this invention.

Figure 4 is a perspective elevational view of the face side of the protective molding strip of this invention.

In Figure 1 there is illustrated a protective molding strip 10 that is mounted on the decorative trim strip 11 that extends along the bottom edge of the window opening 12 of the car door 13. The car door 13 has the usual vent-pane 14.

The protective molding strip 10 as more particularly shown in Figures 3 and 4, consists of a curved body portion 21 that includes an upper horizontal run 22 and a vertical run 23 which follows the contour of the decorative trim strip 11 of the automobile car door.

The horizontal run 22 of the molding strip 10 is provided with a short vertical run 24 from which there depends a series of vertically positioned legs 25. Each of the legs 25, which are substantially parallel to the vertical run 23, is provided with an inwardly turned ear 26 that is substantially parallel with the horizontal run 22.

The vertical run 23 of the molding strip 10 is provided with an edge 27 that is turned inwardly toward the legs 25, and is substantially parallel with the horizontal run 22. This edge 27 is provided with a vertical edge 28 that is substantially parallel with the vertical run 23 and extends upwardly a short distance from the edge 27.

The trim strip 11 of the car door is diagrammatically illustrated in Figure 3 by means of the dot-dash lines. It will be noted that the ears 26 on the legs 25 engage the bottom edge 30 of the trim strip to lock the molding strip onto the trim strip. Also, the edge 28 locks behind the lower edge of the trim strip 11 to thereby hold the molding strip onto the trim strip.

In Figure 2 there is illustrated in more detail the construction of the car door 13 that consists of an outer body panel 40 and an inner body panel 41. The glass pane 42 of the window opening is slidable between the protective felt strips 43 and 44. The protective strip 43 is attached to the outer door panel 40 by means of wire staples 45 that pass through the door panel 40. Similarly, the protective strip 44 is attached to the trim strip 11 by means of the wire staples 46. These wire staples 46 are placed periodically along the length of the trim strip 11 to hold the felt protective strip 44 in place on the trim strip 11.

The trim strip 11 is secured to the door panel 41 by means of screws in any well-known manner.

When the protective molding strip 23 is placed onto the trim strip 11, the legs 25 of the molding strip are placed between adjacent wire staples 46 so that the leg 25 can pass downwardly between the vertical depending edge 30 of the trim strip and the protective felt strip 44. The ear 26 on the leg 25 will snap beneath the lower edge of the edge strip 30 and thereby lock the leg 25 in position between the trim strip 11 and the protective strip 44.

The lower edge 27 of the protective strip 10 is then snapped over the lower edge 48 of the trim strip 11 to lock the lower edge of the molding strip onto the trim strip 11. The edge 28 is retained between the inner face of the trim strip 11 and the upholstery material 49 provided on the inside surface of the inner door panel 41.

Preferably, the molding strip 10 is constructed of a transparent material such as a transparent plastic material so that the molding strip will be inconspicuous when applied to the trim strip on the inside of the automobile body. Thus, the decorative scheme of the interior of the automobile will not be disrupted, since many of them now have simulated wood grain on the trim strips of the car body. However, if desired, the protective molding strip could be made in any suitable color. Also, since the protective molding strip 10 is preferably made of plastic material, it will not be as hot to the touch as would a metal trim strip.

Also, preferably, the protective molding strip 10 is made from a thermoplastic material to prevent softening of the material when heated, and to prevent any substantial change in the contoured shape of the protective molding strip.

If desired, the vertical run 23 of the molding strip 10 can be bowed inwardly, that is, toward the legs 25, to provide a slight spring to the molding strip so that when it is applied to the trim strip it will hug the contour closely.

While the device disclosed and described herein illustrates a preferred form of the invention, yet it will be understood that it is capable of modification without departing from the spirit of the invention, and that those modifications that fall within the scope of the appended claims are intended to be included herein.

Having thus fully described my invention, what I claim as new and desire to secure by Letters Patent is:

1. In combination, automobile car door comprising, an outer door panel having a window opening therein, an inner door panel having a corresponding window opening therein and spaced from the outer door panel, a window glass movable vertically between said panels, a trim molding positioned around the window opening of said inner door panel including a lower horizontal run, a resilient bumper strip between said window glass and the horizontal run of said trim molding and attached to said trim molding by fastening means placed periodically along the length of said bumper strip, and a protective molding strip formed substantially to the contour of the horizontal run of said trim molding, said protective molding strip including a plurality of projecting leg portions along one edge thereof positioned between said trim molding and said bumper strip and between said fastening means and including projection means at the opposite edge of the protective molding strip engaging the opposite edge of said trim molding whereby to retain said protective molding strip in position on said trim molding.

2. In combination, an automobile car door comprising, an outer door panel having a window opening therein, an inner door panel having a corresponding window opening therein and spaced from the outer door panel, a window glass movable vertically between said panels, a trim molding positioned around the window opening of said inner door panel including a lower horizontal run, a resilient bumper strip between said window glass and the horizontal run of said trim molding and attached to said trim molding by fastening means placed periodically along the length of said bumper strip, and a protective molding strip formed substantially L-shaped in transverse cross-section and consisting of a smooth horizontal run and a smooth vertical run with the said runs joined by a curved portion on a substantially constant radius, the said formed strip including a plurality of projecting leg portions depending from the horizontal run disposed substantially parallel to the vertical run and positioned between the said trim molding and said bumper strip with the leg portions located between said fastening means, said strip further having a portion projecting from the vertical run disposed substantially parallel to the horizontal run and directed inwardly toward said leg portions and terminating in a hooked portion extending toward the horizontal run and disposed substantially parallel with the vertical run with the said hooked portion wrapping around the lower edge of the trim molding, whereby said molding strip is retained in position on said trim molding.

HOWARD A. JACOBS.

REFERENCES CITED

The following references are of record in the file of this patent:

UNITED STATES PATENTS

| Number | Name | Date |
|---|---|---|
| 1,967,357 | Fry | July 24, 1934 |
| 2,279,345 | Reid | Apr. 14, 1942 |
| 2,504,234 | Strickland | Apr. 18, 1950 |
| 2,536,895 | West | Jan. 2, 1951 |